(No Model.)
R. G. BAILEY.
BICYCLE SUPPORT.
No. 585,458. Patented June 29, 1897.
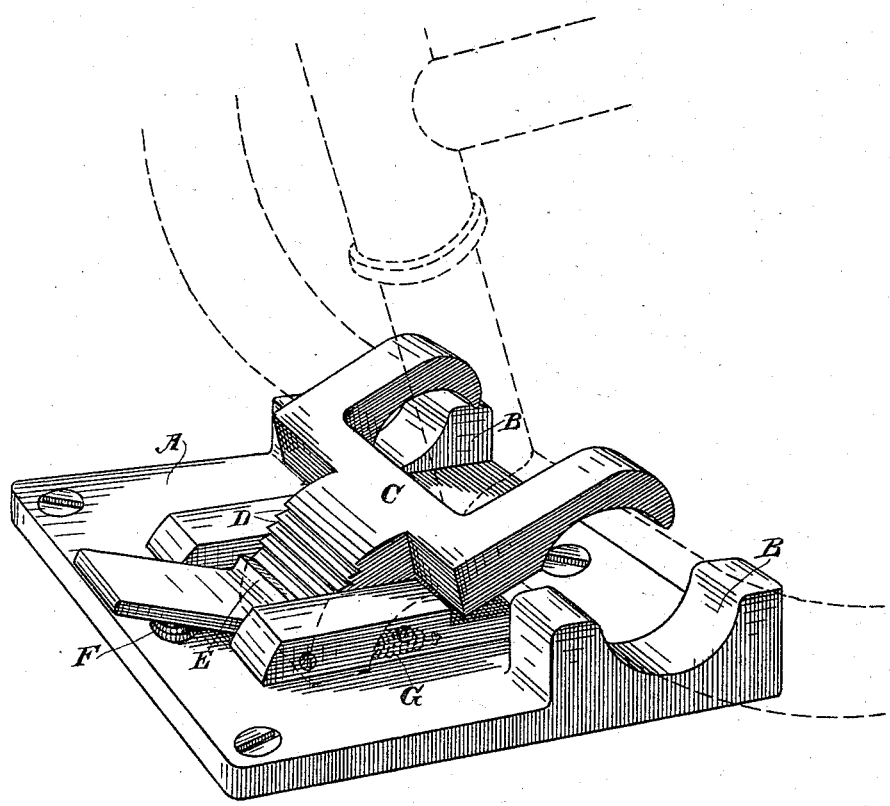
Witnesses,
J. H. Nourse
H. F. Ascheck
Inventor,
Rufus G. Bailey
By Dewey & Co.
Attys

UNITED STATES PATENT OFFICE.

RUFUS GEORGE BAILEY, OF SAN JOSÉ, CALIFORNIA.

BICYCLE-SUPPORT.

SPECIFICATION forming part of Letters Patent No. 585,458, dated June 29, 1897.

Application filed July 17, 1896. Serial No. 599,493. (No model.)

*To all whom it may concern:*

Be it known that I, RUFUS GEORGE BAILEY, a citizen of the United States, residing at San José, county of Santa Clara, State of California, have invented an Improvement in Bicycle-Supports; and I hereby declare the following to be a full, clear, and exact description of the same.

My invention relates to a novel bicycle stand or support which is especially adapted for holding bicycles in a reversed position, so that they may be cleaned or otherwise attended to.

It consists in certain details of construction which will be more fully explained by reference to the accompanying drawing, in which the figure is a view of my support in a closed condition.

The object of my invention is to provide a simple convenient device for firmly holding bicycles in a reversed or upside-down position, so that they may be cleaned or any work done upon them which is more conveniently done while in this position.

A is a base-plate, of any suitable size and form, adapted to be firmly secured upon the floor or other support. Upon opposite sides of this base-plate near one edge are the concave lugs B, which are sufficiently separated to receive the handle-bar where it projects upon each side of the steering-head. These lugs are also raised above the bed, as shown.

In the center and at the opposite side of the plate A is fulcrumed a yoke C, the projecting arms of which are parallel with the concave lugs B and are so formed that when the bicycle has been reversed and the handle-bar laid in the concavity of the lugs B the arms of the yoke can be turned down so as to press upon the opposite side of the handle-bar as it lies either inside or outside of the lugs B, as may be preferred, and thus hold it firmly in place.

The central portion of the yoke, which forms the part through which the pivot-pin passes, is made segmental in form and is provided with ratchet-teeth D.

E is a pawl, pivoted so that it engages with the ratchet-teeth D. This pawl may be actuated by a spring F, which normally holds its point in contact with the teeth, and the yoke may also be actuated by a spring G, attached in any suitable or desired manner, so as to normally throw it up when not locked by the pawl.

The operation of the device will then be as follows: The bicycle being reversed the handle-bars are laid in the concavities of the lugs B, the saddle or rear portion of the machine resting upon the floor or other convenient support in rear of the plate A, which is firmly fixed. The yoke C is then turned down until its arms clamp firmly upon the upper sides of the handle-bars as they lie, and the pawl will engage the ratchet-teeth on its segmental portion, so as to hold it in place and firmly lock the handle-bars, so as to prevent any tilting or movement of the machine. Any work can then be done about it without further difficulty.

When it is desired to release the machine, it is only necessary to press upon the pawl to disengage it from the ratchet, and this allows the yoke to be turned up by the action of its spring, when the machine can be removed.

Having thus described my invention, what I claim as new, and desire to secure by Letters Patent, is—

An improved bicycle-support consisting of a flat horizontally-disposed plate having spaced concave lugs rising from its top surface, a yoke centrally located on the plate and fulcrumed thereto said yoke having spaced arms to embrace the upper sides of the handle-bars of an inverted bicycle and having an integral portion extending centrally from the arms and made segmental, and provided with ratchet-teeth, a pawl fulcrumed near the central extension of the yoke and adapted to engage the ratchet-teeth thereof whereby the yoke is locked when its arms are closed upon the handle-bars, and a spring by which the yoke is disengaged from the bar.

In witness whereof I have hereunto set my hand.

RUFUS GEORGE BAILEY.

Witnesses:
J. I. BURNHAM,
SAMUEL G. TOMPKINS.